United States Patent [19]

Weick et al.

[11] Patent Number: 4,845,497
[45] Date of Patent: Jul. 4, 1989

[54] CONFERENCE CIRCUIT FOR A DIGITAL COMMUNICATION SYSTEM

[75] Inventors: Günter Weick, Eckental; Lothar Windolf, Nuremberg, both of Fed. Rep. of Germany

[73] Assignee: U. S. Philips Corporation, New York, N.Y.

[21] Appl. No.: 127,822

[22] Filed: Dec. 1, 1987

[30] Foreign Application Priority Data

Dec. 4, 1986 [DE] Fed. Rep. of Germany ....... 3641503

[51] Int. Cl.$^4$ .............................................. H03M 7/50
[52] U.S. Cl. ......................................... 341/75; 370/62
[58] Field of Search ................... 340/347 DD; 370/62; 341/53, 61, 75

[56] References Cited

U.S. PATENT DOCUMENTS 4,730,306 3/1988 Uchida ................................... 370/62

Primary Examiner—William M. Shoop, Jr.
Assistant Examiner—Marc S. Hoff
Attorney, Agent, or Firm—Marianne R. Rich

[57] ABSTRACT

A 001 conference circuit for a digital communication system in which the analog-to-digital and digital-to-analog converters of at least two subscriber terminal stations have different bandwidth of their processable analog signals or in the code format of the digital signals or in the bit rate of the digital signals. It is not necessary for any conference participant to adapt to the equipment of any one of the other participants because the conference circuit comprises transcoders and corresponding transdecoders of different construction for each conference participant. This anoids the requirement that all conference participants must agree on the same bandwidth, the same code and the same bit rate.

When establishing a conference connection, a control circuit actuates the appropriate transcoder and the corresponding transdecoder required for each conference participant. Each conference participant receives signals from the other participants during the conference, having the same quality as in the case of a connection between only two participants.

5 Claims, 1 Drawing Sheet

CONFERENCE CIRCUIT FOR A DIGITAL COMMUNICATION SYSTEM

The invention relates to a conference circuit for a digital communication system in which the analog-to-digital and digital-to-analog converters of at least two subscriber terminal stations can be distinguished in the bandwidth of their processable analog signals, in the codes of the digital signals, or in the bit rate of the digital signals.

A conference circuit for a digital communication system is known from European Patent Application No. 0,081,799. This conference circuit forms part of an exchange unit of the communication system. The subscriber terminal stations of the transmission system transmit information in PCM words of 8 bits each, while the codeword repetition frequency, which is identical to the sampling rate of the analog speech signals in the subscriber terminal stations, is 8 kHz. To reduce the bit rate with respect to linear quantization at a substantially constant speech quality, the sampling values are not directly converted into codewords, but the magnitudes of the sampling values are subjected to an (approximate) log function, while the log function magnitudes are represented as a combination of 7 bits and then transmitted, together with the sign bit, as 8-bit PCM words. The sampling values are thus coded in accordance with a non-linear (in this case approximately logarithmic) coding characteristic, or in more concise and general terms: they are coded non-linearly. If the PCM words represent the binary sampling values while using a linear characteristic, use of a linear coding is indicated.

Due to the non-linear coding of the PCM words, a conversion (transcoding) of the PCM words from a subscriber circuit into PCM words with linear coding is effected in the known conference circuit before the (digital) signals of all conference participants are combined to sub-sums. The PCM words of the sub-sums are non-linearly coded and then transmitted to the terminal stations of the conference participants. The sub-sum signal intended for a conference participant will hereinafter be understood to mean the sum of the signals for all other conference participants.

In a communication system the subscribers can often select from different types of subscriber terminal stations. A communication system is then obtained in which the analog-to-digital and digital-to-analog converters can be distinguished in the bandwidth of their processable analog sigals or in the codes of the digital signals or in the bit rate of the digital signals.

SUMMARY OF THE INVENTION

It is an object of the invention to provide a conference circuit with which each participant can hold conferences with other participants without having to adapt terminal stations to one another. The information received by a conference particpant from other participants during the conference should not be less or noisier than the information which the participant would receive individually from any other participant.

This object is solved with a terminal station of each conference particpant having a plurality of transcoders and an equal number of corresponding transdecoders in the conference circuit. The number of transcoders corresponds to the number of subscriber terminal stations, which are different in accordance with the added criteria. All transcoders can supply a linearly coded PCM signal at their secondary end, which signal has a wordlength and word repetition frequency which is suitable for representing the information content of the subscriber signal having the largest bandwidth. The digital signal of each conference participant is converted into a linearly coded PCM signal by means of an associated transcoder. All linearly coded PCM signals are summed to sub-sum signals by means of an adder circuit. A sub-sum signal intended for a conference participant is transmitted to his terminal station via an associated transdecoder.

As compared with a conference in which all conference participants must agree in advance on a given bandwidth, a given code and a given bit rate, the invention has the advantage that each participant can select his own terminal station equipment and take part in conferences without any deterioration of the speech quality.

The invention will now be further described by way of example with reference to the accompanying drawings.

DESCRIPTION OF THE PREFERRED EMBODIMENT

The two Figures show a communication system in which many terminal stations can process PCM signals of 8-bit code words and a code repetition frequency (sampling rate) of 8 kHz and other terminal stations can process only ADPCM signals (Adaptive Differential Pulse Code Modulation) with a sampling rate of 16 kHz and a wordlength of at most 4 bits. The number of conference participants is 3.

Figure 1:
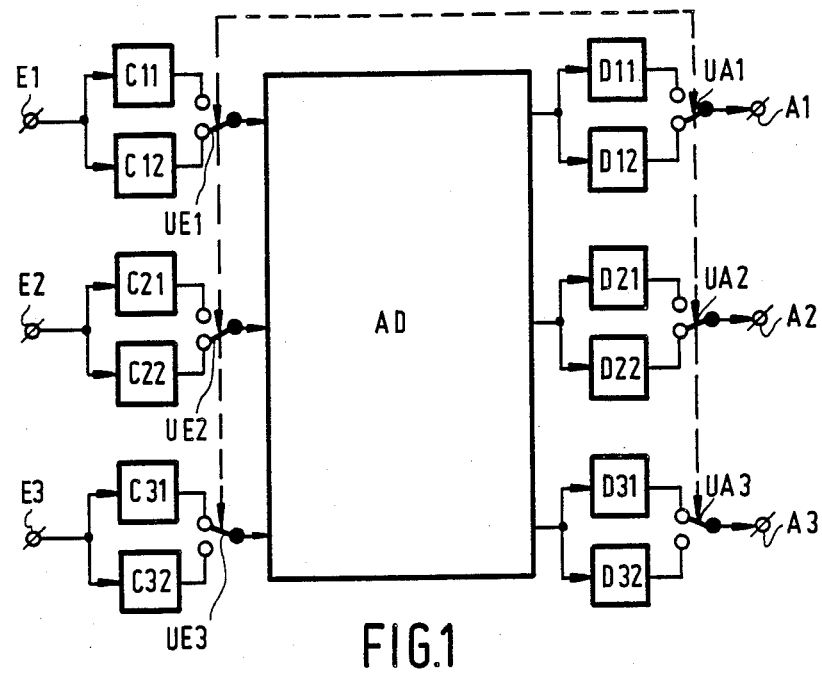
FIGS. 1 and 2 show circuit diagrams of conference circuits having the characteristic features of the invention.

According to FIG. 1 the transcoders C11, C12 and transdecoders D11, D12 are intended for a first conference participant, whilst the transcoders C21, C22 and C31, C32 and the transdecoders D21, D22 and D31, D32 are intended for a second and a third conference participant, respectively. The transcoders C11, C21 and C31 convert non-linearly coded 8-bit PCM words into 14-bit code words having a linear PCM coding. Simultaneously, the word repetition frequency is increased to 16 kHz by inter-polation and oversampling. The transcoders C12, C22 and C32 convert ADPCM signals into 14-bit PCM words having a linear coding. The word repetition frequency is also 16 kHz in this case.

The transdecoders D11, D21 and D31 change 14-bit PCM words of linear coding and a word repetition frequency of 16 kHz into 8-bit PCM words of non-linear coding and a word repetition frequency of 8 kHz by means of filtering, sub-sampling and quantization. Likewise the transdecoders D12, D22 and D32 render the coders C12, C22 and C32 ineffective. A transcoder and a transdecoder are herein understood to be "corresponding" when the output signal of the transdecoder originates with to the input signal of the transcoder.

One of the transcoders C11 or C12 can be connected via a switch UE1 to an input of an adder circuit AD. The same applies to the transcoders C21, C22 and C31, C32 and the switches UE2 and UE3, respectively. The inputs of the transdecoders D11 and D12 are connected to an output of the adder circuit AD likewise as the inputs of the transdecoders D21, D22 and D31, D32.

The output of one of the two transcoders D11 and D12 may be connected via a further switch UA1 to a connection A1 through which the signals are passed which are supplied to the first participant. The same applies to the transdecoders D21, D22 and D31, D32 for the switches UA2 and UA3 and the connections A2 and A3, respectively.

When the conference connection is established, signals coming from the conference participants are present at terminals E1, E2 and E3. The first participant transmits his message as an ADPCM signal of the above described format.

A control circuit, roughly shown in FIG. 1, thus connects the transcoder C12 via the switch UE1 to the adder circuit AD and the transdecoder D12 to the connection A1. The same applies to the second participant who can transmit and receive his message likewise in ADPCM with the above-mentioned format. The third participant only processes PCM signals in a non-linear coding consisting of 8-bit code words having a repetition frequency of 8 kHz.

Consequently, the control circuit connects the transcoder C31 to the adder circuit AD and the transdecoder D31 to the connection A3. The adder circuit AD now forms subsums from its input signals, and the output signal of the adder circuit AD intended for a participant consists of the sum of the input signals of the other two participants. In the relevant case, for example, the two 14-bit code words of the second and third participants, which codewords are present at the adder circuit, are to be summed for the first participant and the sum is applied to the output for the first participant. The problems which may occur when forming the sub-sums signals (inter alia, overflow) and their elimination are described, for example, in an article by R. Hofmann (Hofmann, R: Digitale Telefonkonferenzen. PKI Technische Mitteilungen 1/1086, pages 53 to 56).

Figure 2:
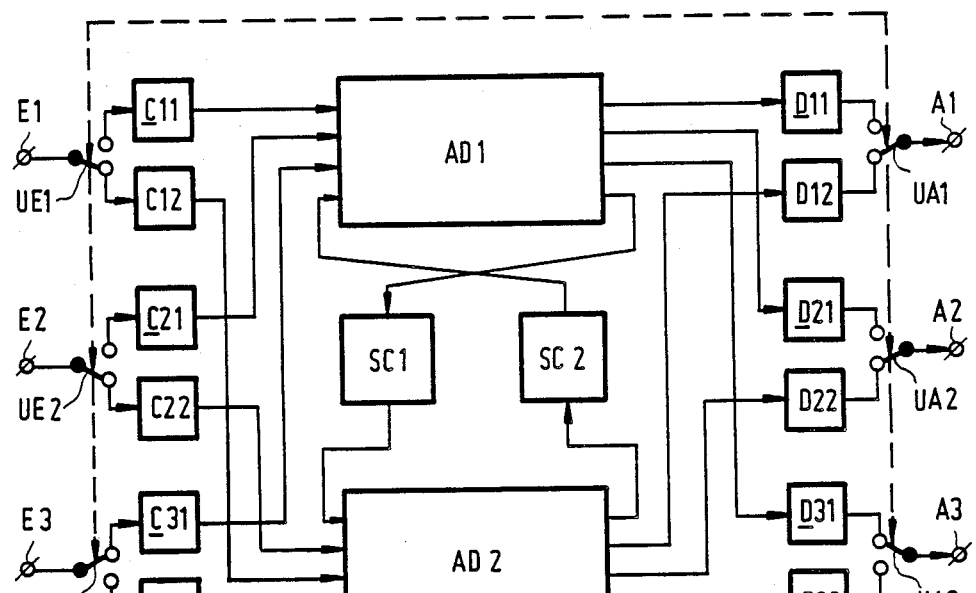

In a conference circuit according to FIG. 2 the units and connections having the same functions as in the conference circuit of FIG. 1 have the same reference numerals. The first of the three conference participants whose transmission signals are present at the terminals E1, E2 and E3 transmits his messages again as an ADPCM signal in the format mentioned hereinbefore. The same applies to the second participant, whilst the third participant uses non-linearly coded PCM signals in the format also mentioned hereinbefore.

The transcoders denoted by the references C11, C21 and C31 convert non-linearly coded PCM signals into linearly coded PCM signals of, for example, 12 bits. The corresponding transdecoders are denoted by references D11, D21 and D31. The transcoders C12, C22 and C32 convert the ADPCM signals into linear PCM signals having a wordlength of 14 bits and a word repetition frequency of 16 kHz.

A pair of transcoders (C11, C12), (C21, C22), and (C31, C32) and a pair of corresponding transdecoders (D11, D12), (D21, D22) and (D31, D32) are assigned to each conference participant or his terminal station.

A control circuit (not shown) gives the controllable switches UE1, UE2 and UE3 a position in which the signals from the terminal stations formally correspond to the input signals for the transcoders. The same applies to the switches UA1, UA2 and UA3, the transdecoders and the signals applied to the terminal stations.

The outputs of the transcoders C11, C21 and C31 are connected to the inputs of a first adder circuit AD1 and the output of the transcoders C12, C22 C32 are connected to the inputs of a second adder circuit AD2. The adder circuit AD1 forms sub-sums of, for example, its 12-bit input signals and the adder circuit AD2 forms sub-sums of its 14-bit input signals.

The adder circuit AD2 is connected to the adder circuit AD1 as a further participant. Conversely, an output of the adder circuit AD1 is connected via an intermediate transcoder SC1 to an input of the adder circuit AD2, and an output of the adder circuit AD2 is connected via a corresponding intermediate transdecoder SC2 to an input of the adder circuit AD1. The intermediate transdecoder SC1 converts the 12-bit PCM words of linear coding into 14-bit PCM words of linear coding by means of interpolation and oversampling and new quantisation. Before the conversion the word repetition frequency is 8 kHz and after the conversion it is 16 kHz. The reverse process is effected by the intermediate transdecoder SC2 by means of filtering and sub-sampling. Due to the interconnection of the adder circuits AD1 and AD2, the adder circuit AD2 receives the (recoded) sum signal of all conference participants connected to the adder AD1. The adder circuit AD1 receives the (recoded) sum signal of all conference participants connected to the adder circuit AD2.

Therefore, the signal applied to the input of the transdecoder D12 and intended for the first conference participant consists of the sum of the signals of the two other participants, which is represented in linear PCM coding with codewords of 14 bits and a codeword repetition frequency of 16 kHz. The same applies to the other transdecoders.

The arrangement shown in FIG. 2 permits utilisation of an adder which may be already present before taking the measures according to the invention, in so far as this adder is intended for participants supplying logarithmically coded PCM signals or ADPCM signals.

What is claimed is:

1. A conference circuit for a digital communication system having a communication system format and a plurality of different types of subscriber terminals having a different subscriber data format comprising:
    a multiplicity of transcoders associated with each subscriber location, each interfacing one of a multiplicity of said subscriber terminal equipment having different types of digital subscriber data formats to produce linear digital data having the same format of data transferred by said digital communication system;
    a multiplicity of transdecoders associated with each subscriber location, each converting linear data received at each subscriber location from said digital communication system to data having a respective one of said multiplicity of subscriber data formats compatible with at least one type of said subscriber terminal; and
    an adder circuit connected to said data communication system for adding together said linear digital data received from a transcoder of each subscriber location, thereby forming conference data packets, and transmitting said packets over said digital communication systems to transdecoders at subscriber stations which participate in a conference.

2. The conference circuits of claim 1 wherein said communication system linear digital code format provides a bandwidth sufficient to transfer data to any of said different types of subscriber data format.

3. The conference circuit of claim 1 further including switch means for connecting a selected one of said transcoders at each of said subscriber locations to said digital communications system, and a corresponding one of said transdecoders to a corresponding one of said terminal equipment.

4. A conference circuit for a digital communication system in which a plurality of different types of subscriber terminals which transmit and receive digital data of different formats are interconnected to form a conference comprising:

- at least two transcoders associated with each subscriber station for converting transmit data from at least two types of terminal equipment into first and second linear data formats, respectively;
- first and second transdecoders associated with each subscriber station for receiving conference data in said first and second of linear data formats;
- a first adder circuit for adding transmit data of said first linear data format from said transcoders which generate data of said first linear data format and delivering conference data to transdecoders which receive linear data of said first linear data format;
- a second adder circuit for adding linear transmit data of said second linear data format from said transcoders which generate linear data of a second linear data format, and creating conference data for said transdecoders which receive linear data of said second format;
- a first intermediate transcoder for converting linear data from said first adder to data of said second linear data format, and applying said data of said second linear data format to said second adder circuit; and,
- a second intermediate transcoder for converting conference data of said second linear data format from said second adder circuit to data of said first linear data format for said first adder.

5. The conference circuit of claim 4 further including first and second switch means associated with each subscriber terminal for connecting one of said of transcoders and one of said of transdecoders to said associated terminal equipment at a respective subscriber location.

* * * * *